(12) United States Patent
McCullough et al.

(10) Patent No.: US 9,683,696 B2
(45) Date of Patent: Jun. 20, 2017

(54) MOUNTING SYSTEM FOR SECURING FURNITURE TO A WALL

(71) Applicants: Cody Vincent McCullough, Lima, OH (US); Barry Allen McCullough, Lima, OH (US)

(72) Inventors: Cody Vincent McCullough, Lima, OH (US); Barry Allen McCullough, Lima, OH (US)

( * ) Notice: Subject to any disclaimer, the term of this patent is extended or adjusted under 35 U.S.C. 154(b) by 273 days.

(21) Appl. No.: 14/327,907

(22) Filed: Jul. 10, 2014

(65) Prior Publication Data

US 2016/0010793 A1    Jan. 14, 2016

(51) Int. Cl.
*F16M 13/02* (2006.01)
*A47C 19/02* (2006.01)

(52) U.S. Cl.
CPC ......... *F16M 13/022* (2013.01); *A47C 19/022* (2013.01); *F16M 13/02* (2013.01)

(58) Field of Classification Search
CPC .... F16M 13/022; F16M 13/02; A47C 19/022; F16B 2/14
USPC ........... 248/220.21, 220, 22, 223.31, 223.41, 248/345.1
See application file for complete search history.

(56) References Cited

U.S. PATENT DOCUMENTS

| 1,081,378 A | 12/1913 | Freeman |
| 3,424,421 A * | 1/1969 | Kalbow ................. A47J 47/16 211/74 |
| 3,540,687 A | 11/1970 | Cuva |
| 3,822,049 A | 7/1974 | Saunders |
| 3,927,315 A | 12/1975 | Werry |
| 3,989,215 A | 11/1976 | Weston |
| 4,332,052 A | 6/1982 | Remington |
| 4,467,990 A * | 8/1984 | Wiseman ............. A47F 5/0823 248/220.31 |
| 4,613,135 A | 9/1986 | Rush |
| 5,129,613 A | 7/1992 | Lloyd et al. |
| D329,192 S * | 9/1992 | Susac ............................ D8/349 |
| 5,146,631 A | 9/1992 | Deal |
| 5,232,191 A | 8/1993 | Infanti |
| 5,251,959 A | 10/1993 | Braal et al. |
| 5,707,033 A | 1/1998 | Holt et al. |
| 5,865,562 A * | 2/1999 | Mallek ..................... E06B 9/00 248/220.22 |
| 7,077,372 B2 | 7/2006 | Moran |
| 7,134,635 B2 | 11/2006 | Burriel et al. |
| 8,544,805 B2 | 10/2013 | Virgin |
| 2009/0256037 A1 | 10/2009 | Singh |

* cited by examiner

*Primary Examiner* — Anita M King
(74) *Attorney, Agent, or Firm* — Jason H. Foster; Kremblas & Foster

(57) ABSTRACT

A mounting system is disclosed for removably securing furniture to a wall. The mounting system includes a bracket member having a rear plate to be secured to a back surface of a furniture, a pair of side portions that extend forward from the back plate, and a pair of front end portions that extend inwardly from the side portions respectively to define an elongated vertical slot in the bracket member, and a sliding member having a sliding portion sized to be vertically slid into and out of the vertical slots, and an attachment portion forwardly extending from the sliding portion and secured to the wall, having a width that is substantially equal to or less than a width of the central opening of the vertical slot.

19 Claims, 6 Drawing Sheets

MOUNTING SYSTEM FOR SECURING FURNITURE TO A WALL

BACKGROUND OF THE INVENTION

This invention relates generally to the field of mounting systems and devices, and relates more particularly to a mounting system for removably securing headboards or furniture to walls or supporting surfaces.

Many people find that furniture, such as the headboards of their beds, would bump against the wall behind the bed, causing noise as well as damage to the wall. This issue exists with all types and styles of beds, such as a bed with a thin bed frame, or a bed with a thick bed frame. Often, a bed frame is loose, or loosens with use, so that the headboard will make contact with the wall against which it is placed. Even if the headboard is tightly attached to the bed frame, the headboard will bump against the wall when the bed is in use, such as when a kid jumps into a bed, or when a person is tossing or turning in the bed.

Other furniture, such as a dresser, can be unstable due to the unevenness of the floor or due to unanticipated uses of such furniture, among other factors. Such unstable furniture is very dangerous. For example, a dresser can fall on top of the child if he or she happens to climb into one of the upper drawers.

Conventional mounting systems or devices are often complex. They typically require a certain degree of precision along with special tools and fasteners to install the system, making them relatively difficult to install, especially for relatively heavy furniture, such as a bed or a dresser. Further, most feature a relatively permanent construction. After the installation of the system, the furniture cannot be easily relocated.

BRIEF SUMMARY OF THE INVENTION

It would therefore be advantageous to provide an inexpensive, simple and easy-to-install mounting device or system that can removably secure furniture to a wall, more specifically for securing a headboard of a bed to a wall that can also accommodate daily usage. It would further be advantageous to provide such a device that is easy to install and disassemble, can be used on and for many different types of furniture, and is small enough to be substantially hidden from general viewing. More preferably, it would be very desirable to provide a system or device to secure a headboard of a bed to a wall, which will be easy to install, applicable for various styles and sizes of the beds, and accommodate the constant fluctuation in the headboard positions due to constant usage.

In accordance with the present invention, there is provided a mounting system or device for removably securing furniture to a wall. For purposes of the present invention, the furniture refers to items used at home that are relatively heavy and are stationed on the floor, such as a bed, a dresser, etc. Preferably, the suitable furniture includes items that can be stationed against a wall. More preferably, the present invention is an easy to install device or system that can be used to removably secure the headboard of a bed to a wall. Further, the present invention is robust enough to accommodate for imprecision during installation and for constant fluctuations in the headboard positions due to constant usage of the bed.

The mounting system includes a bracket member having a rear plate to be secured to a back surface of furniture, a pair of side portions that extend forward from the back plate, and a pair of front end portions that extend inwardly from the side portions respectively to define an elongated vertical slot with open upper and lower ends in the bracket member; and a sliding member having a sliding portion sized to be vertically slid into and out of the vertical slot, and an attachment portion forwardly extending from the sliding portion and suitable for being secured to the wall. The attachment portion has a width that is substantially equal to or less than a width of a central opening of the vertical slot. The bracket member engages the sliding member by vertically mounting the elongated vertical slot slidingly onto a substantial portion of the sliding portion of the sliding member, and projecting the attachment portion through the central opening of the vertical slot to be secured to the wall.

Preferably, the attachment portion is sufficiently thick so that when the bracket member engages the sliding member, the attachment portion extends past outer surfaces of the front end portions of the bracket member. The sliding portion has a thickness that is substantially equal to or less than a thickness of the vertical slot so that the sliding portion is closely received in the vertical slot.

In some further embodiments, one or more spacers are attached to the attachment portion to be secured to the wall.

During the installation, the bracketing member is attached or secured to approximately the upper center of the backside of furniture, e.g. the upper center of the backside of a headboard (the side facing the wall) (see FIG. 10). The sliding member is then attached to a suitable location or position on the wall. The suitable location has approximately the same height (also called the vertical position) as that of the corresponding bracket member, and is preferably located on a wall stud. The bracket member engages the sliding member by lifting the furniture to vertically mount the bracket member onto the sliding member. The installation is relatively easy because the vertical position (height) of the sliding member can be slightly different from that of the corresponding vertical position (height) of the bracketing member. Further, the sliding member can move up and down the bracket member slightly without reducing the stability of the system to accommodate the movement of the headboard during frequent usage of the bed.

BRIEF DESCRIPTION OF THE SEVERAL VIEWS OF THE DRAWINGS

FIG. 3A is a top view illustrating a preferred embodiment of a bracket member of the present invention with three holes for fasteners to attach the bracket member to furniture.

FIG. 3B is a top-side view illustrating a preferred embodiment of the bracket member shown in FIG. 3A with an elongated vertical slot having two channels.

FIG. 3C is a side view illustrating the preferred embodiment of the bracket member shown in FIG. 3A.

FIG. 3D is an end view illustrating the preferred embodiment of the bracket member of the present invention shown in FIG. 3A.

FIG. 4A is a perspective top view illustrating a preferred embodiment of a sliding member of the present invention with two holes for fasteners to attach the sliding member to the wall.

FIG. 4B is a perspective top-side view illustrating the preferred embodiment of the sliding member of the present invention shown in FIG. 5.

FIG. 4C is a perspective side view illustrating the preferred embodiment of the sliding member of the present invention shown in FIG. 5.

FIG. 4D is a perspective end view illustrating the preferred embodiment of the sliding member of the present invention shown in FIG. 5.

Figure 1:
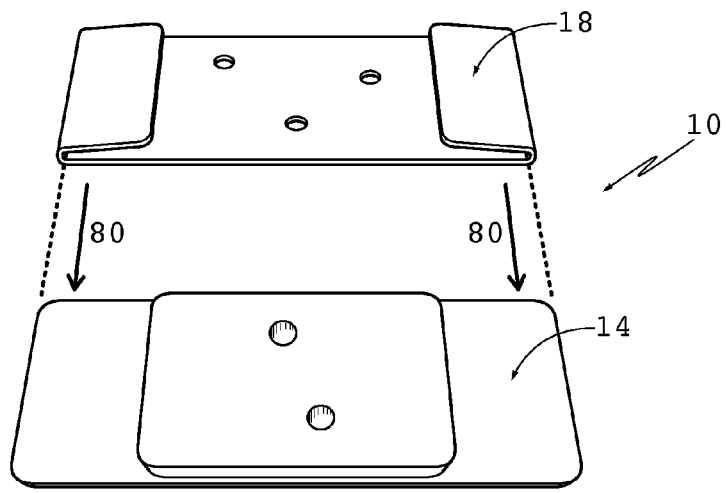
FIG. 1 is a perspective view of a preferred embodiment of a mounting system of the present invention with a bracket member 18 and a sliding member 14.
Figure 2A:
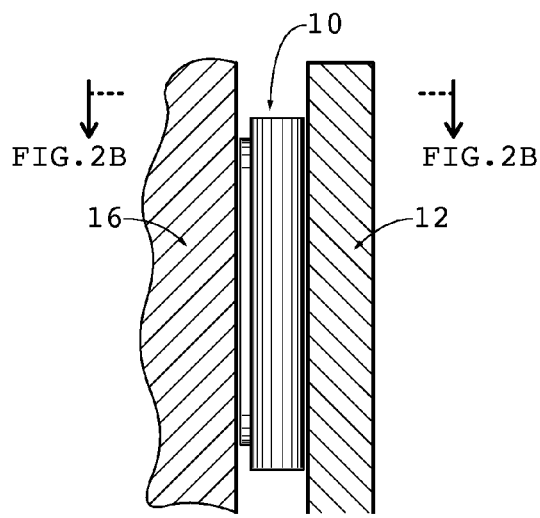
FIG. 2A is a side view illustrating the preferred embodiment of the present invention as shown in FIG. 5 in a fully assembled position, securing a headboard 12 to a wall 16.
Figure 2B:
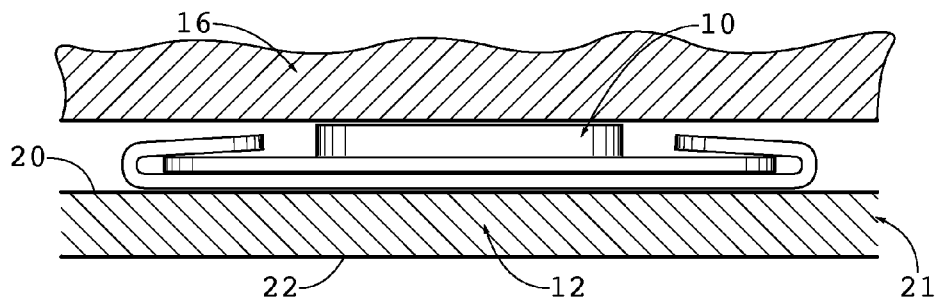
FIG. 2B is a top view illustrating the preferred embodiment of the present invention as shown in FIG. 5 in a fully assembled position, securing a headboard 12 to a wall 16.
Figure 3A:
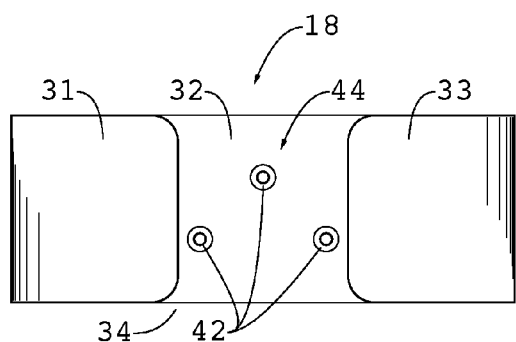
FIGS. 3A to 3D include various schematic views of a preferred embodiment of a bracket member of the present invention.
Figure 3B:
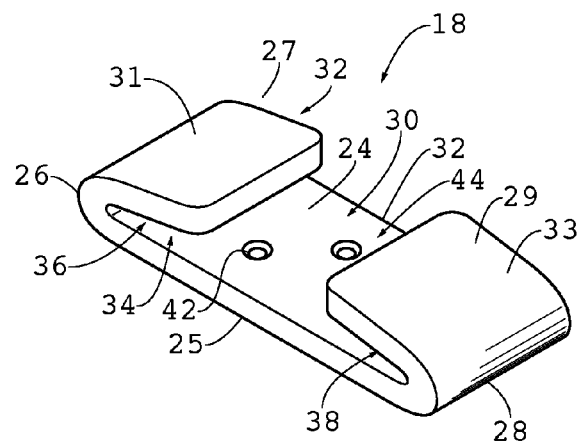
Figure 3C:
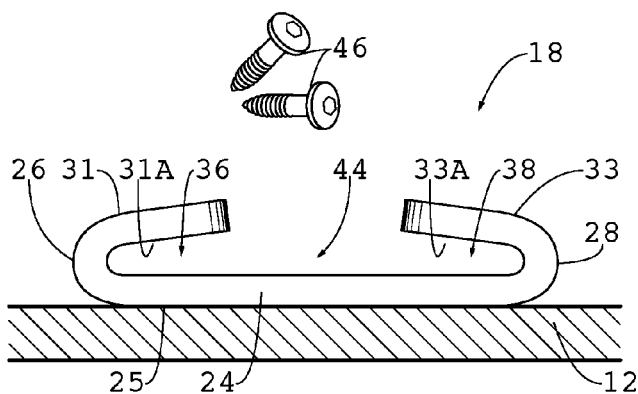
Figure 3D:
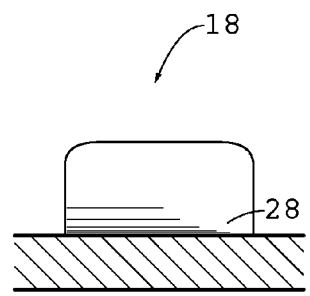
Figure 4A:
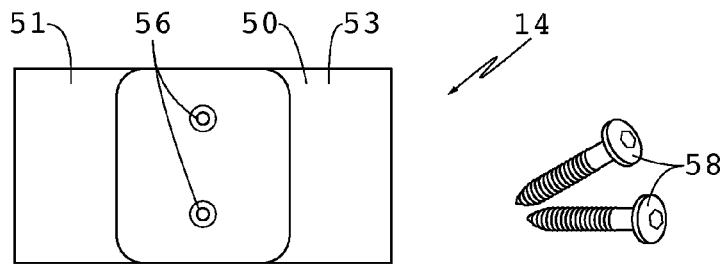
FIGS. 4A to 4D include various schematic views of a preferred embodiment of a sliding member of the present invention.
Figure 4B:
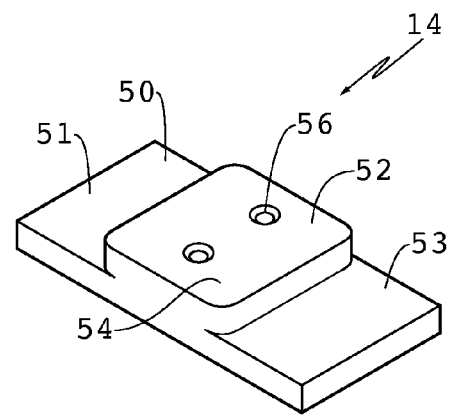
Figure 4C:
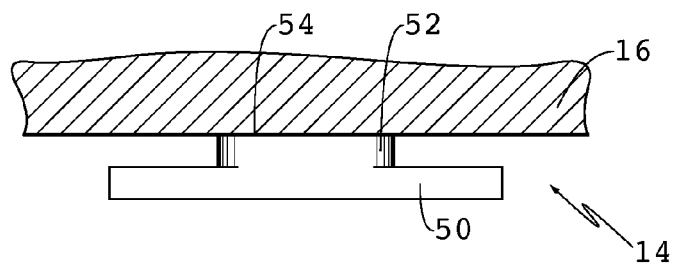
Figure 4D:
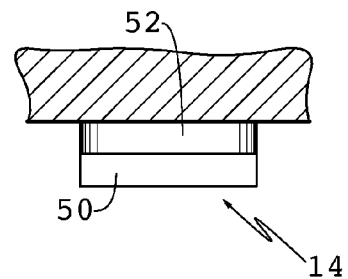
Figure 5:
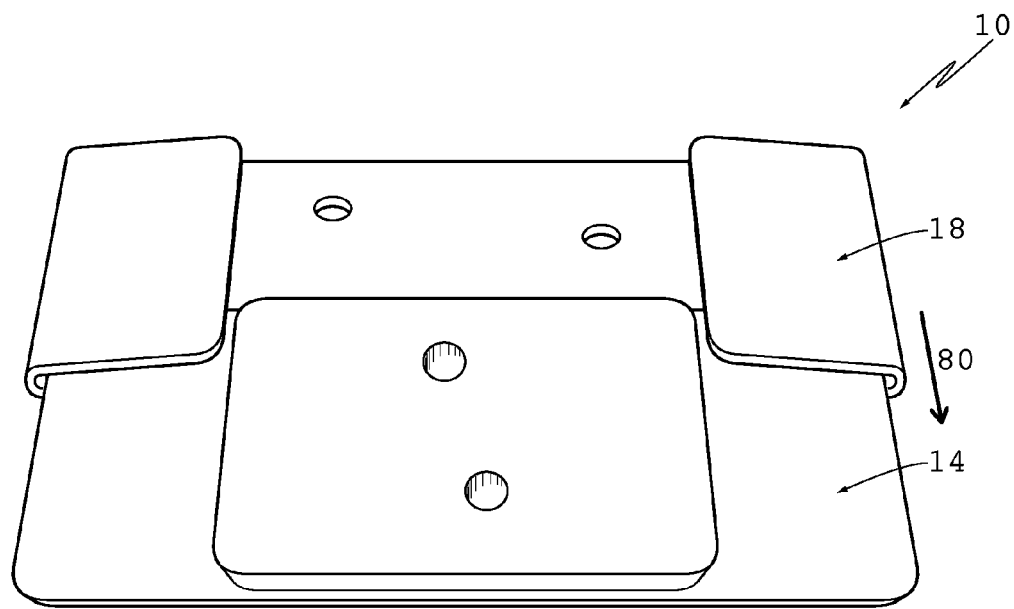
FIG. 5 is a perspective view illustrating the preferred embodiment of the present invention shown in FIG. 1 in which the bracket member is partially mounted onto the sliding member, with the bracket and sliding members not secured to the wall and not secured to the furniture.
Figure 6:
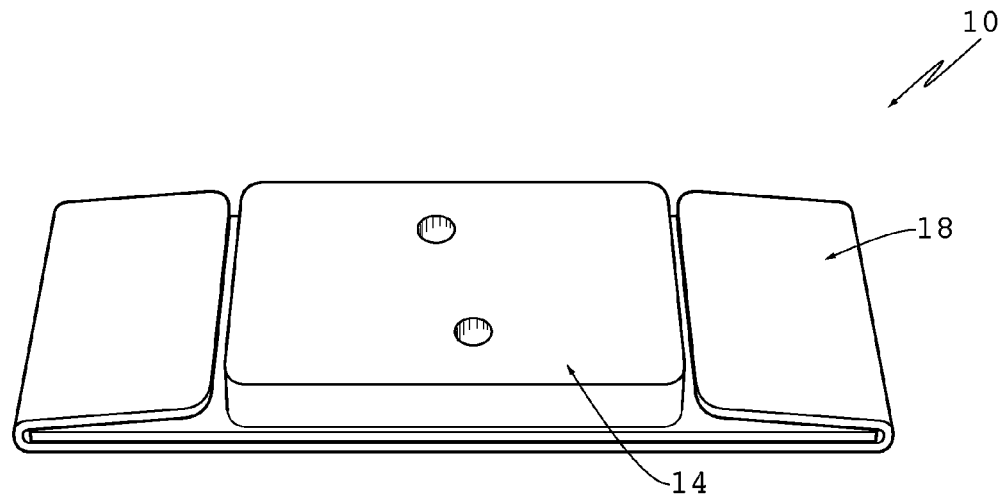
FIG. 6 is a top view illustrating the preferred embodiment of the present invention as shown in FIG. 5, in which the bracket member is fully mounted onto the sliding member, with the bracket and sliding members not secured to the wall or to the furniture.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

It will be apparent to those skilled in the art, that is, to those who have knowledge or experience in this area of technology, that many uses and design variations are possible for the mounting systems disclosed herein. The following detailed discussion of various alternative and preferred embodiments will illustrate the general principles of the invention with regard to a mounting system for furniture, preferably for heavy set furniture, such as a bed or a dresser. Other embodiments of the present invention suitable for other applications will be apparent to those skilled in the art given the benefit of this disclosure such as for example, a book case, a desk, and the like.

Referring now to FIGS. 1-6, which show a mounting system 10 for a headboard 12 of a bed (not shown) according to the present invention. The illustrated mounting system or assembly 10 includes a sliding member 14 secured to a substantially vertical support wall or surface 16, and a bracket member 18 secured to a headboard 12, which can be slidingly mounted onto the sliding member 14 to secure the headboard 12 (and its related bed frame or bed) to the wall 16 so that the entire bed is substantially stabilized relative to the wall. The sliding member 14 and the bracket member 18 are preferably constructed from a relatively light weight, yet durable metal or synthetic material. Aluminum, stainless steel and various metal alloys, heavy duty wooden material and molded plastics may be used. The headboard mounting system 10 is relatively small in comparison to the size of the headboard 12, for example, in some embodiments, the mounting system 10 can be approximately 1 to 3 inches wide, 3 to 5 inches long, and 0.5 to 1 inch thick.

The illustrated headboard 12 is preferably rectangular shaped, and has a substantially planar rear side 20 that faces the wall 16, a substantially planar front side 22 that faces the mattress, and a width 21 that varies. Other generally accepted or suitable shapes of the headboards can alternatively be utilized, such as oval, or curved, etc. The headboard can be an integral part of the bed frame, or it can be detachable from the bed frame.

The illustrated bracket member 18 has a substantially planar or flat rear plate 24 capable of being secured to the headboard 12. The flat rear plate 24 is preferably rectangular shaped, but other shapes can also be used. Preferably, the rear plate 24 is made of durable metal or plastic. A pair of side portions 26, 28 extend forwardly from the rear plate 24, and a pair of front end portions 27, 29 extend, preferably substantially perpendicularly, inwardly from side portions 26 and 28, respectively. That is, in some embodiments, the front end portions 27, 29 extend inwardly from the side portions 26, 28 in a substantially perpendicularly fashion as shown in FIGS. 3A to 3D. In some embodiments, the front end portions 27, 29 extend inwardly from the side portions 26, 28 in a slightly curved fashion as shown in FIGS. 1, 2A-2B, and 5 to 10. As a result, the bracket member 18 defines an elongated vertical slot 30 that extends longitudinally from an open upper end 32 to an open lower end 34 of the bracket member 18, and extends laterally from an interior surface of the side portion 26 to an interior surface of the side portion 28. The vertical slot 30 includes a pair of longitudinally (or vertically) open channels 36 and 38 that are defined by the side portions 26, 28 and the inwardly turned front end portions 27, 29, and that have the open upper end 32 and the open lower end 34. The vertical slot 30 also includes a central opening 44 that is defined by the space between the front end portions 27 and 29. The central opening 44 exposes a large portion of the vertical slot 30 when the sliding member 14 is disengaged from the bracket member 18. The bracket member 18 and the vertical slot 30 are sized and shaped to cooperate with the sliding member 14 during installation and during the usage of the furniture as described in more detail hereinafter. It is noted that the bracket member 18 can alternatively have any other suitable form. In some preferred embodiments, the front end portions 27, 29 have beveled or curved edges so that a small child would not be harmed by the sharp edges if she or he happens to get caught between the headboard 12 and the wall 16.

Figure 10:
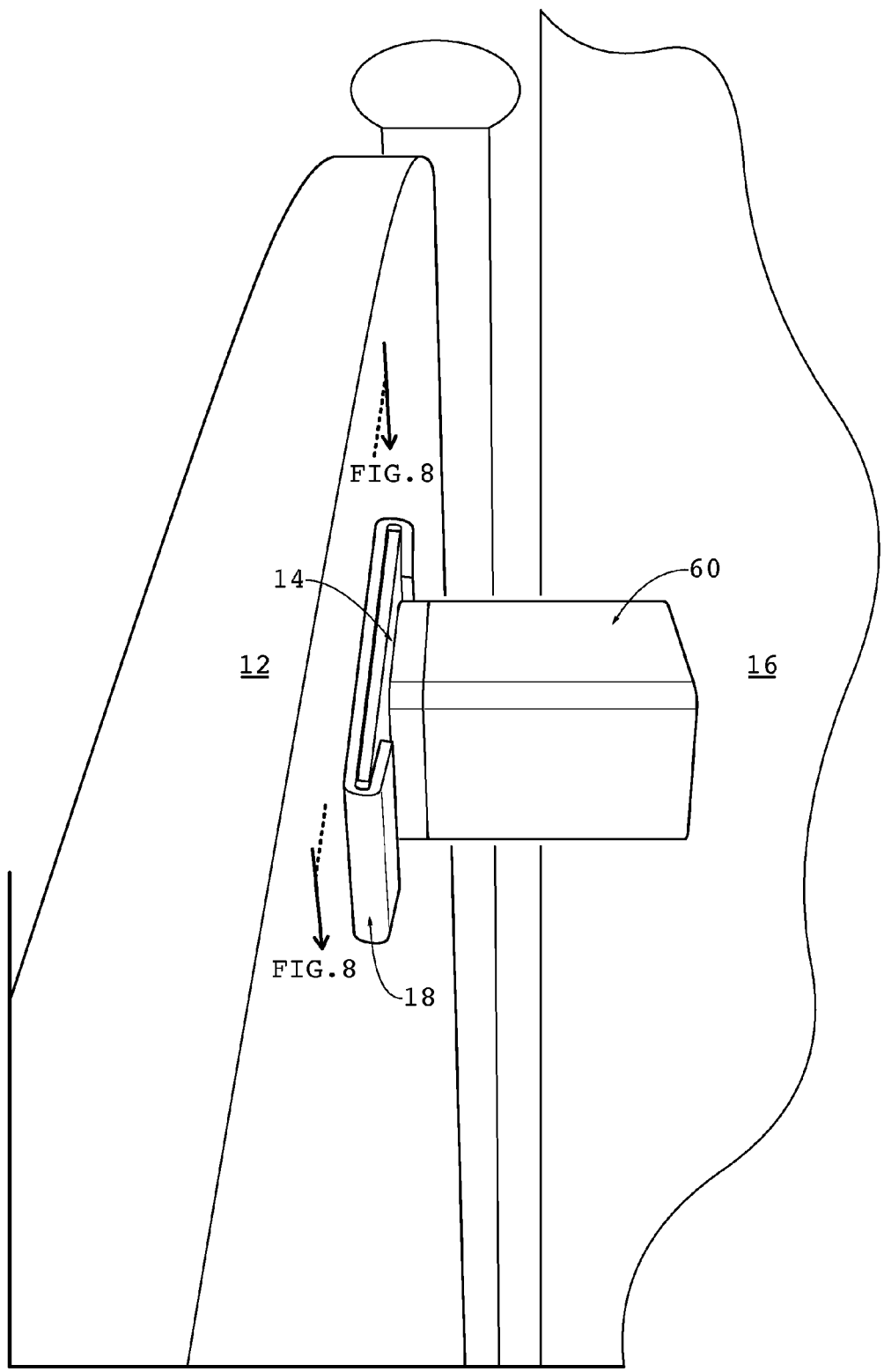
FIG. 10 is a side view illustrating the preferred embodiment of the present invention as shown in FIG. 8 in a fully assembled position, securing a headboard 12 to a wall 16.

The illustrated rear plate 24 has one or more holes 42 for receiving mechanical fasteners 46 to secure the bracket member 18 to the headboard, preferably around the upper center of the headboard (see FIG. 10). Three holes are preferred when the headboard is at least ⅝ inches thick. The holes 42 are preferably situated in the approximately center of the bracket member 18. More preferably, these holes 42 are positioned proximately in a triangular fashion in the middle of the opening 44 so that screws or other suitable fasteners can be easily installed into the holes to secure the bracket member to the supporting wall.

The mechanical fastener 46 can be a thread forming screw, for example, screw 96068A105 available from McMaster-Carr Company. It is noted that any other suitable fastener can alternatively be utilized so long as they are capable of securing the bracket member 18 to the wall, such as various types of adhesive. For example, the illustrated rear plate 24 can have a layer of pressure sensitive adhesive (not shown) at a rear side 25 of the rear plate 24 to secure the bracket member 18 to the headboard 12. The pressure sensitive adhesive can be a two sided tape such as, for example, 3M VHB 2-way tape available from the 3M Company. It is noted that other suitable adhesive can alternatively be utilized. It is also noted that alternatively, a combination of one of the mechanical fastener 46 and the pressure sensitive adhesive or any other type of combination of fastening means can be utilized. Utilizing the mechanical fastener 46 can be advantageous when a person is rearranging the bed because the fastener 46 can be unscrewed from the bracket member 18 and the headboard 12, allowing the bracket member 18 to be put aside until a new location for the bed is chosen.

The illustrated sliding member 14 has a sliding portion 50 sized to be vertically slid into and out of the vertical slot 30 and an attachment portion 52 forwardly extending from the sliding portion 50 and secured to the supporting wall 16. Preferably, the sliding member 14 is attached to the structural element of the wall 16 so that the engaged and assembled mounting system of the present invention is able to secure or stabilize the heavy weight of a bed or other types of furniture. Typically, the structural element of a wall includes posts, columns or studs. For a more secure attachment, the sliding member 14 is preferably attached or secured to a wall stud. A wall stud is a vertical framing member in a building's wall of a smaller cross section than a post, holding in place the windows, doors, interior finish, exterior sheathing or siding, insulation and utilities, and helping give shape to a building. A wall stud corresponding to the approximate center of the headboard (where the bracket member 18 is likely to be installed) can be located by using a stud finder. Alternatively, the wall stud can be found by gently pounding on the wall with a hammer.

The illustrated sliding portion 50 is rectangular shaped and sized to be relatively closely received in the vertical slot 30 of the bracket member 18. In particular, the sliding portion 50 has two flanges 51 and 53 that are suitable to be slid into the channels 36 and 38 of the vertical slot 30. The flanges 51, 53 have a thickness substantially equal to or less than the thickness depth of the channels 36, 38 so that they are closely received in the channels with minimal play therein.

The illustrated attachment portion 52 is rectangular or square shaped and sized to extend through the central opening 44 of the bracket member 18 when the flanges 51, 53 of the sliding portion 50 are engaged in the channels 36, 38 of the bracket member 18. The edges of the attachment portion 52 and/or the sliding portion 50 are preferably curved or beveled to make the sliding member 14 safer for handling. Preferably, the illustrated attachment portion 52 has a width smaller than a width of the sliding portion 50 so that lateral sides of the attachment portion 52 are spaced laterally inward from lateral sides of the sliding portion 50. The illustrated attachment portion 52 preferably has a height similar to a height of the sliding portion 50 so that the top and bottom sides of the attachment portion 52 are substantially flush with the top and bottom sides of the sliding portion 50. Alternatively, the illustrated attachment portion 52 has a height less than the height of the sliding portion 50 so that the top and bottom sides of the attachment portion 52 are spaced vertically inward from the top and bottom sides of the sliding portion 50. Thus, all of the edges of the illustrated attachment portion 52 are spaced inward from the adjacent edges of the sliding portion 50. It should be appreciated, however, that the upper and lower edges of the attachment portion 52 can extend beyond the upper and lower edges of the sliding portion 50 if desired.

Figure 7:
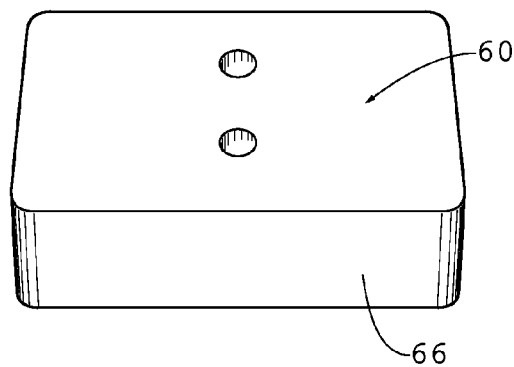
FIG. 7 is a side view illustrating an alternative embodiment of a sliding member of the present invention with a spacer next to the attachment portion of the sliding member.
Figure 8:
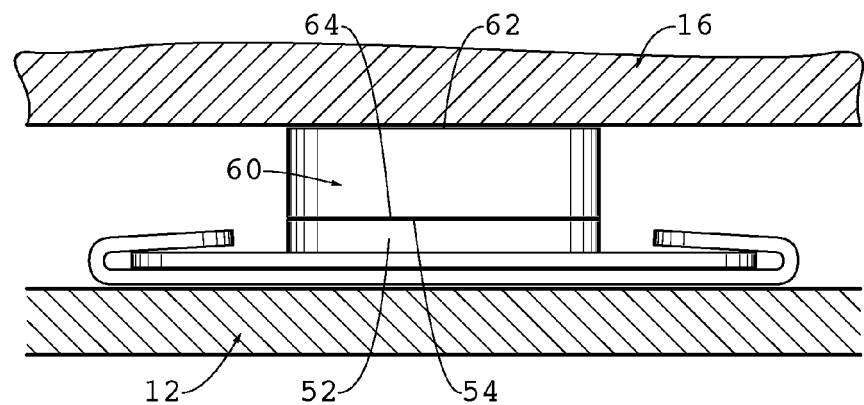
FIG. 8 is a perspective view illustrating the spacer in the alternative embodiment of the present invention shown in FIG. 7.
Figure 9:
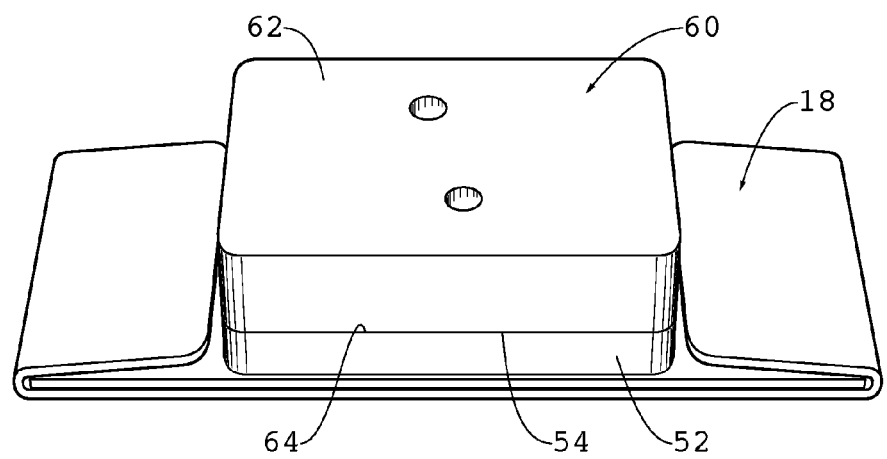
FIG. 9 is a perspective side view illustrating the alternative embodiment of the present invention in which the bracket member is mounted onto the sliding member, which is attached to the spacer.

The illustrated attachment portion 52 of the sliding member 14 has a thickness bigger than thicknesses of the front end portions 27, 29 of the bracket member 18. The thickness of the front ends 27, 29 of the bracket member 18 approximately equals the distance between the outer surfaces 31, 33 of the front end portions 27, 29 and the inner surfaces of 31A, 33A of the front end portions 27, 29. When the sliding member 14 engages the bracket member 18, the attachment portion 52 preferably extends above the outer surfaces 31, 33 of the bracket member 18 by a minimum of ⅛ inch. In some preferred embodiments as illustrated in FIGS. 7 to 9, spacers 60 are used to provide more distance between the wall and the headboard, which will be described in more detail later. It is noted that the sliding member 14 can alternatively have any other suitable form.

The illustrated sliding member 14 has one or more holes 56 for receiving mechanical fasteners 58 to secure the sliding member 14 to the wall stud. The holes 56 extend through both the attachment portion 52 and the sliding portion 50. In a preferred embodiment, two holes 56 are positioned vertically in the approximately center of the bracket member 18. More preferably, the two holes 56 are positioned in a non-linear vertical fashion.

The mechanical fastener 58 can be an elongated thread forming screw such as, for example, screw 96068A105 available from McMaster-Carr Company. The mechanical fastener 58 is substantially longer than the mechanical fastener 46. It is noted that any other suitable fastener can alternatively be utilized so long as it is suitable for securing the sliding member (possibly the spacer(s)) to the wall, such as various types of adhesive. For example, the illustrated attachment portion 52 can have a layer of pressure sensitive adhesive (not shown) at a rear side 54 of the attachment portion 52 to secure the sliding member 14 to the wall 16. The pressure sensitive adhesive can be a two sided tape such as, for example, 3M VHB 2-way tape available from the 3M Company. It is noted that other suitable adhesive can alternatively be utilized. It is also noted that alternatively a combination of one of the mechanical fastener 58 and the pressure sensitive adhesive or any other type of combination of fastening means can be utilized. Utilizing the mechanical fastener 58 can be advantageous when a person is rearranging the bed because the fastener 58 can be unscrewed from the sliding member 14 and the wall 16, allowing the sliding member 14 to be re-installed in another chosen location.

Initially, the sliding member 14 is secured to the wall stud in the manner shown in FIG. 3. The rear side 54 of the attachment portion 52 is placed against the outer surface of the wall 16 such that the holes 56 in the sliding member 14 align with respective holes formed in the wall 16. An elongated screw (a preferred fastener) is then engaged with each set of aligned holes. As a result, the sliding member 14 is securely fastened to the wall stud 16. Aside from the screw and adhesive mentioned above, the fasteners may comprise various types of conventional fasteners, including bolts, screws, rivets, and other standard means. In alternative embodiments, other techniques may be used to secure the sliding member 14 to the wall stud.

After the bracket member 18 is secured to an appropriate location on the backside of the headboard 12, the sliding member 14 is then secured to a corresponding location on the wall 16. Alternatively, the sliding member 14 is first secured to a pre-marked location on the wall 16, and then the bracket member is secured to a pre-marked location on the back of the headboard 12. The suitable location for the sliding member 14 has approximately the same height (also called the vertical position) as that of the corresponding bracket member 18. The bracket member 18 along with its attached headboard 12 are lifted high enough so that the bracket member 18 is lowered in the direction of the arrow 80 to slidably mount onto the sliding portion 50 of the sliding member 14 until a substantial portion of the sliding portion 50 is inserted into the vertical slot 30 of the bracket member 18. In other words, the bracket member 18 is interengaged with the sliding member 14 by aligning the vertical slot 30 with the sliding portion 50 in the manner shown in FIGS. 2, 5 and 6. The vertical slot 30 is slidably mounted in the direction of arrow 80 onto the sliding portion 50 such that the vertical flanges 51, 53 of the sliding portion 50 is received in the channels 36, 38 respectively. The attachment portion 52 of the sliding member 14 projects out of the central opening 44 of the bracket member 18.

Preferably, the bottom edge of the sliding portion 50 is substantially flush with the bottom edge of the vertical slot 30 of the bracket member 18, and the upper edge of the sliding portion 50 is substantially flush with the upper edge of the bracket member 18. It should be appreciated, however, that the upper and bottom edges of the sliding portion 50 or the sliding member 14 can be less than or extend beyond the upper and bottom edges of the bracket member 18 so long as a substantial portion of the sliding portion 50 is inserted into the vertical slot 30 of the bracket member 18. The substantial portion is in the range of about 10% to about 100%, preferably in the range of about 50% to about 100%. In other words, a small portion of the bottom edge of the sliding member 14 can extend out of the open bottom 34 of the vertical slot 30 of the bracket member 18. Alternatively, a small portion of the upper edge of the sliding member 14 can extend out of the open top 32 of the vertical slot 30 of the bracket member 18.

Therefore, the present invention offers flexibilities to the users in situations where the alignment of the bracket member 18 and the sliding member 14 is slightly or somewhat off during installation. As described above, the vertical position or height of the sliding member 14 on the wall 16 can differ slightly or relatively substantially from that of the bracket member 18 on the headboard 12 so long as a substantial portion of the sliding member 14 is inserted into the bracket member 18 to ensure secure engagement. This way, a user does not need to spent a long time to ensure the positions of the two members match each other precisely, nor does a user need to undertake re-installation if the user finds the two members can not engage due to mismatch of the positioning.

Further, the mounting system accommodates for the constant fluctuations of the headboard's position as the bed is being used. For example, the headboard is typically mounted onto the wall when a bed is not being used. After a person gets into the bed, the headboard might dip slightly, shifting the bracket member 18 downward, which might cause the bracket member 18 to move slightly out of alignment with the sliding member 14 while still remaining strongly engaged with each other. So, when a person gets out of the bed, the headboard might shift upwards slightly, moving the bracket member 18 upward, shifting the bracket member 18 back into alignment with the sliding member 14. Accordingly, in addition to being easy to install, the present invention is robust enough to accommodate for the various fluctuations in the height of the headboard due to daily usage while keeping the headboard securely attached to the wall.

FIGS. 8-10 illustrate an alternative mounting system, which is substantially the same as the mounting system 10 described above except one or more spacers 60 are added to extend the distance between the headboard 12 (or furniture) and the wall 16. The spacer 60 is preferably rectangular, having a rear surface 62 that faces the wall 16, a front surface 64 to be attached to the rear side 54 of the attachment portion 52 of the sliding member 14, and four sides 66. The rear and front surfaces of the spacer 60 have a length and a height that are substantially equal to or less than the length and the height of the attachment portion 52 of the sliding member 14. Thus, all edges of the spacers 60 substantially flush with the edges of the attachment portion 52. It should be appreciated, however, that the edges of the spacers can extend beyond the edges of the attachment portion 52 if desired. The width of the sides 66 (also called the width of the spacer 66) is preferably in the range of 0.3 inches to about 1 inch. The width of the spacer 66 can vary depending upon the size of the bed, and the thickness and size of the headboard or the furniture. Further, more than one spacer 66 can be used. The number of the spacers is dependent upon the size and style of the bed, the thickness and size of the headboard.

For example, for a full sized bed with a headboard having a thickness of ¾ inch or less, no spacer is needed for the headboard mounting system of the present invention; however, a spacer can be used if desired. For a Queen sized bed with a headboard having a thickness of ¾ inch to 1¼ inch, one spacer having a width of 0.4 inches is preferred.

This invention can also be used to anchor or secure other types of furniture, such as a dresser, a desk, or bookcase, to the wall. In case the present invention is used to secure a dresser to the wall, the bracket member 18 is secured to the approximate upper center of the backside of the dresser. The sliding member 14 is attached to a suitable position on the wall that corresponds approximately to the position of the bracket member 18. The dresser is then lifted to mount the bracket member 18 onto the sliding member 14 so that a substantial portion of the sliding member 14 is inserted into the vertical slot 30 of the bracket member 18.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A mounting system for removably securing furniture to a wall, comprising:
   a. a bracket member having a rear plate to be secured to a back surface of the furniture, a pair of side portions that extend forward from the rear plate, and a pair of front end portions that extend inwardly from the side portions respectively to define an elongated vertical slot with an open upper end and an open lower end;

b. a sliding member having a sliding portion sized to be vertically slid into and out of the enlongated vertical slot, and an attachment portion forwardly extending from the sliding portion and secured to the wall, having a width that is substantially equal to or less than a width of a central opening of the enlongated vertical slot; and wherein the bracket member engages the sliding member by slidingly mounting a substantial portion of the sliding portion of the sliding member onto the elongated vertical slot, and projecting the attachment portion of the sliding member through the central opening of the vertical slot to be secured to the wall, and wherein the open upper end and the open lower end of the bracket member cooperate with the sliding member to allow for vertical fluctuations of the sliding member within the enlongated vertical slot during usages of the furniture after securing the furniture to the wall through the mounting system.

2. The mounting system according to claim 1, wherein the attachment portion is sufficiently thick so that when the bracket member engages the sliding member, the attachment portion extends past outer surfaces of the front end portions of the bracket member.

3. The mounting system according to claim 1, wherein the attachment portion extends past outer surfaces of the front end portions by a minimum of 1/8 inch.

4. The mounting system according to claim 1, wherein a thickness of the sliding portion is substantially equal to or less than a thickness of the vertical slot so that the sliding portion is closely received in the vertical slot without any stop section so as to allow for fluctuations of the sliding portion within the vertical slot during usages of the furniture after securing the furniture to the wall through the mounting system.

5. The mounting system according to claim 1, wherein the rear plate has one or more holes for one or more fasteners to secure the bracket member to the furniture.

6. The mounting system according to claim 1, wherein the sliding member has one or more holes for one or more fasteners to secure the sliding member to the wall.

7. The mounting system according to claim 1, further comprising one or more spacers attaching to the attachment portion to be secured to the wall.

8. The mounting system according to claim 1, wherein the attachment portion of the sliding member has beveled or curved corners.

9. The mounting system according to claim 1, wherein the furniture is a bed with a headboard.

10. A headboard mounting system, comprising:

a. a headboard having a rear side and a front side facing a bed frame;

b. a bracket member having a rear plate to be secured to the rear side of the headboard, a pair of side portions that extend forward from the rear plate, and a pair of front end portions that extend inwardly from the side portions respectively to define an elongated vertical slot with an open upper end and an open lower end and is without any stop section; and b. a sliding member having a sliding portion without any stop section and is sized to be vertically slid into and out of the vertical slots, and an attachment portion forwardly extending from the sliding portion and secured to the wall, having a width that is substantially equal to or less than a width of the central opening of the vertical slot; and wherein the bracket member engages the sliding member by vertically mounting the elongated vertical slot slidingly onto the sliding portion of the sliding member, and projecting the attachment portion through the central opening of the vertical slot.

11. The headboard mounting system according to claim 10, wherein the attachment portion is sufficiently thick so that when the bracket member engages the sliding member, the attachment portion extends past outer surfaces of the front end portions of the bracket member.

12. The headboard mounting system according to claim 10, wherein the attachment portion extends past outer surfaces of the front end portions by a minimum of 1/8 inch.

13. The headboard mounting system according to claim 10, wherein a thickness of the sliding portion is substantially equal to or less than a thickness of the vertical slot so that the sliding portion is closely received in the vertical slot without any stop section.

14. The headboard mounting system according to claim 10, wherein the rear plate has one or more holes for one or more fasteners to secure the bracket member to the rear side of the headboard of a bed.

15. The headboard mounting system according to claim 10, wherein the sliding member has one or more holes for one or more fasteners to secure the sliding member to the wall.

16. The headboard mounting system according to claim 10, further comprising one or more spacers attaching to the attachment portion to be secured to the wall.

17. The headboard mounting system according to claim 10, wherein the attachment portion of the sliding member has beveled or curved corners.

18. A mounting system for removably securing furniture to a wall, comprising:

a. a bracket member having a rear plate to be secured to a back surface of furniture, a pair of side portions that extend forward from the rear plate, and a pair of front end portions that extend inwardly from the side portions respectively to define an elongated vertical slot with an open upper end and an open lower end without any stop section;

b. a sliding member having a sliding portion without any stop section and is sized to be vertically slid into and out of the enlongated vertical slot, and an attachment portion forwardly extending from the sliding portion and secured to the wall, having a width that is substantially equal to or less than a width of a central opening of the enlongated vertical slot; and wherein the bracket member engages the sliding member by slidingly mounting a substantial portion of the sliding portion of the sliding member onto the elongated vertical slot, projecting the attachment portion of the sliding member through the central opening of the vertical slot to be secured to the wall;

and wherein the furniture is a bed with a headboard, and the bracket member is attached to a rear side of the headboard of the bed.

19. A mounting system for removably securing furniture to a wall, comprising:

a. a bracket member having a rear plate to be secured to a back surface of furniture, a pair of side portions that extend forward from the rear plate, and a pair of front end portions that extend inwardly from the side portions respectively to define an elongated vertical slot with an open upper end and an open lower end without any stop section;

b. a sliding member having a sliding portion without any stop section and is sized to be vertically slid into and out of the enlongated vertical slot, and an attachment portion forwardly extending from the sliding portion and secured to the wall, having a width that is substantially equal to or less than a width of a central opening of the enlongated vertical slot; and wherein the bracket member engages the sliding member by slidingly mounting a substantial portion of the sliding portion of the sliding member onto the elongated vertical slot, projecting the attachment portion of the sliding member through the central opening of the vertical slot to be secured to the wall;

and wherein a thickness of the sliding portion is substantially equal to or less than a thickness of the vertical slot so that the sliding portion is closely received in the vertical slot without any stop section so as to allow for fluctuations of the sliding portion within the vertical slot during usages of the furniture after securing the furniture to the wall through the mounting system.

* * * * *